United States Patent [19]

Ross

[11] Patent Number: 4,922,057
[45] Date of Patent: May 1, 1990

[54] ELECTRICAL BOX FOR WIRING DEVICES

[76] Inventor: Dan E. Ross, 308 Almaville Rd., Smyrna, Tenn. 37167

[21] Appl. No.: 281,442

[22] Filed: Dec. 8, 1988

[51] Int. Cl.$^5$ .............................................. H02G 3/08
[52] U.S. Cl. .................................................. 174/65 R
[58] Field of Search ................... 174/65 R, 53; 220/3, 220/2

[56] References Cited

U.S. PATENT DOCUMENTS

| 4,306,109 | 12/1981 | Nattel | 174/65 X |
| 4,316,999 | 2/1982 | Nattel | 174/65 R |
| 4,424,405 | 1/1984 | Nattel | 174/53 |
| 4,724,282 | 9/1988 | Troder | 174/65 R |

FOREIGN PATENT DOCUMENTS 1952634 5/1971 Fed. Rep. of Germany .... 174/65 R

Primary Examiner—Leo P. Picard
Assistant Examiner—David Tone
Attorney, Agent, or Firm—E. Strickland

[57] ABSTRACT

An electrical box for receiving a wiring device and having means for the reception of a conductor for connection to the wiring device. A relatively flat conductor retaining member is disposed in opposed tracts provided in the box that allows slidable movement of the flat member in the box. The member is adapted to secure a conductor in the box when slidably moved to engage the conductor, and for releasing the conductor by simply lifting the rear edge of the flat member above a ledge in the front of the box, and sliding the flat member past the ledge and from the conductor.

3 Claims, 1 Drawing Sheet

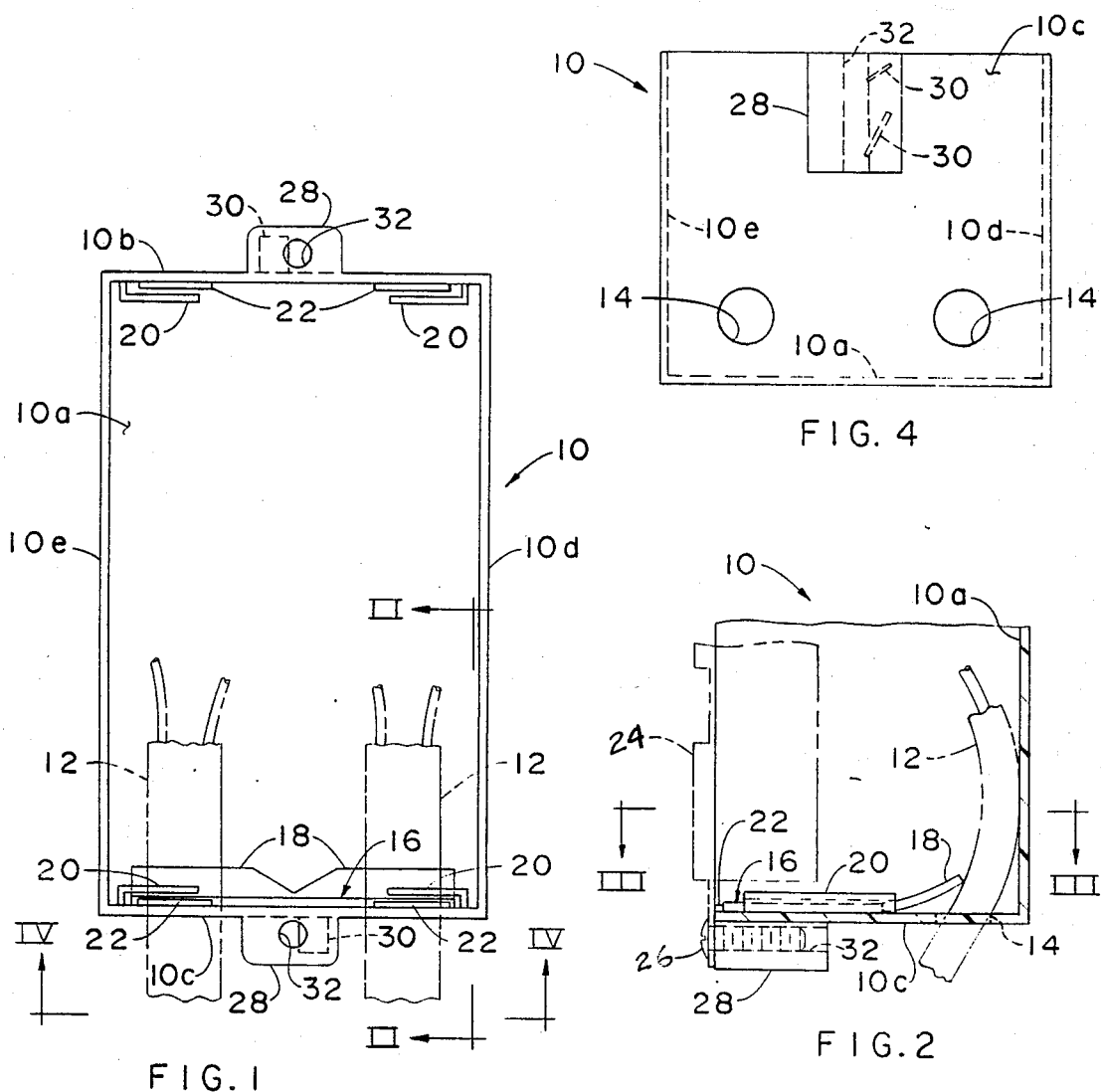

ELECTRICAL BOX FOR WIRING DEVICES

BACKGROUND OF THE INVENTION

The present invention relates generally to electrical boxes for receiving and holding wiring devices, and particularly to a box having an improved fire stop and conductor retaining device, along with a means for securing the wiring device in a box in an expeditious manner.

Anyone working with electrical boxes commonly employed in dwellings and other types of building structures is familiar with the problem of reaching into the rear of the box after a wiring device has been electrically connected to conductors entering the box to secure fire stops to the rear wall of the box, which also secures the conductors in the box. (A wiring device is, for example, a simple on-off switch or the common duplex female receptacle.) The wiring device and the conductors located in the box obscure the rear of the box and the fire stop. The electrician or other user of the box must reach into the box with a screwdriver and locate the head of a threaded fastener to thread the same into the box to secure the fire stop and conductor retaining member in and to the rear of the box.

U.S. Pat. No. 4,306,109 to Nattel shows a fire stop and conductor securing member in the form of a one-piece slide (clamp 34) that enters the front of the box and two integral slots formed adjacent the corners of the box. When the slide is fully inserted into the box, a tab 82 engages a stop 86 to fix the slide in the box. Thereafter, the slide is not easily removable from the box, and in order to remove a conductor secured by the slide, a screwdriver must be inserted in the rear of the box to release the conductor; this is shown in FIG. 4 of the drawings of the patent.

Another U.S. Pat. issued to Nattel showing a planar cable securing member is U.S. Pat. No. 4,316,999. In this disclosure, a flat member 50 is secured in the box by fold over tabs 46 and 48 which fix the member in the box. Again, in order to remove a conductor held by member 50, a screwdriver must be inserted into the box and engage an angled edge of the member to move it away from the conductor, see FIG. 7 of the patent.

SUMMARY OF THE INVENTION

What is therefore needed in the electrical box art is a means to releasably fix a conductor in the box and release the conductor without having to reach into the rear of the box. This is accomplished by inserting a planar member into the box from its front opening and into parallel guide means provided in the box. When the planar member is fully inserted, a shallow ledge in front of the box secures the planar member in the box. When it is desired to release a conductor held by the planar member or otherwise remove the member from the box, one simply lifts the rear edge of the planar member seated behind the shallow ledge to a height above the ledge and then pull the member rearwardly.

The planar member can also be held in place by a wiring device secured in the box. The securing of the planar member and wiring device in the box is easily effected by metal means provided in integral bosses on the front of the box that allows an electrician or workman to simply push in threaded fasteners into the bosses without threading the fasteners with a screwdriver. In this manner, the securing of a conductor and wiring device in the box is quickly effected.

THE DRAWING

The invention, along with advantages and objectives, will be better understood from consideration of the following detailed description and accompanying drawing of which:

FIG. 1 is a front elevation view of an electrical box showing a conductor clamp secured in the box, and means for easy installation of a wiring device;

FIG. 2 of the invention is a partial sectional view of the box of FIG. 1 taken along lines II—II;

FIG. 3 is a section of the box of FIG. 2 taken along lines III—III of FIG. 2;

FIG. 4 is a plan view of the box of FIG. 1; and

FIG. 5 is a perspective view of the clamping means of the invention.

PREFERRED EMBODIMENT

Referring now to FIG. 1 of the drawing, an electrical box 10 is shown in front elevation, and two insulated conductors 12, in phantom, shown extending into the rear of the box through knockout openings 14 (FIG. 4); only one knockout is visible in FIG. 3. The box has a rear wall 10a (FIGS. 2 and 3), upper and lower end walls 10b and c, and opposed side walls 10d and e. The front of the box is open to receive a wiring device (not shown).

As shown in FIGS. 1 to 3, a planar conductor clamp and fire stop 16 of the invention is shown located in box 10, with a bifurcated end 18 bearing somewhat upwardly against conductors 12. Planar member 16 is shown retained in L-shaped retainers 20 shown located on the inside surfaces of upper and lower end walls 10b and c and adjacent the corners of the box. The spacing of the elongated leg of the L from the end walls and surfaces is sufficient to accommodate the thickness of planar member 16. The L-shaped retainers can be integrally formed in the box or be separately made and then suitably secured in the box.

The material of member 16 is a suitably resilient plastic or metal material.

When planar member 16 is fully inserted into the box and held in place by retainers 20, the end of 16 located at the front of the box seats inside of shallow retaining ledges 22 located at the front of the box on end walls 10b and c. Ledges 22 are shallow in height such that when it is desired to remove planar memeber 16, the user of the box simply lifts the end of 16 adjacent ledges 22 to clear the ledges and pulls on 16 to move it from conductors 12. In this manner, release of the conductors is quickly and easily effected, without the need to reach into the box and lift the bifurcated end 18 of the planar member. Raising the rear edge of 16 is easily effected by simply inserting one's fingernail between ledges 22, or the end of any tool or other object having a narrow or pointed end.

Another or further means to quickly secure planar member 16 in box 10 is a wiring device 24 in phantom outline in FIG. 2. The wiring device is quickly secured in and to the box by simple manual insertion of threaded screws 26, ordinarily retained with wiring devices by paper or plastic nuts, into external bosses 28 located at the front of the box and on the upper and lower walls 10b and c of the box. This is effected by the edge of at least one spring steel piece 30 (FIG. 4) secured within each boss 28 and extending partway across openings 32 provided in the bosses for receiving the threaded fasteners of the wiring device. Pieces 30 are preferably molded in the bosses when the box is molded if the box is made of a plastic material. When a threaded fastener is pushed into an opening 32, the end of the fastener deflects the edge of the metal piece 30 in the way of the fastener, which allows the shank of the fastener to travel pass metal piece 30. The edge of 30 engages the threads of the fastener so that the fastener cannot be removed except by being backed out when rotated by a screwdriver. When the wiring device is removed, planar member 16 releases conductors 12. Again, no tool is needed to be inserted into the rear of box 10 to release the conductors. In FIG. 4, two metal pieces 30 are shown serially located in bosses 28 to engage the fasteners.

One relatively sharp edge spring steel piece 30 is sufficient to secure threaded fasteners 26 in openings 32. The second one of the pieces shown in FIG. 4 simply adds further securing force in holding the fasteners in bosses 28 and thus the wiring device in box 10.

Hence, a wiring device fastened in and to box 10 is effective to secure the planar member in place in the box, and this is effected, again, by simply pushing its two fasteners into the respective bosses 28 of the box. Ledges 22 are, however, preferred as the means to secure member 16 in the box, since, when the wiring device is removed, the member remains in a fire stop, conductor clamping position.

What is claimed is:

1. An electrical box for receiving a wiring device and having means for the reception of a conductor for connection to the wiring device, a generally planar conductor retaining member, opposed tracks provided in the box for slidably containing the edges of said planar member.

said member being adapted to secure the conductor in the box when slidably moved to engage the conductor, and for releasing the conductor by simple sliding movement from the conductor.

said member being held against said conductor by a wiring device secured in the electrical box.

2. The electrical box of claim 1 in which the wiring device is secured in the box by at least one piece of spring metal positioned partially across openings provided in the box for receiving threaded fasteners, said piece of metal engaging the threads of the fasteners when the fasteners are simply manually pushed into the openings.

3. An electrical box for receiving a wiring device and having means for the reception of a conductor for connection to the wiring device, a generally planar conductor retaining member, opposed tracks provided in the box for slidably containing the edges of said member, said member being adapted to secure the conductor in the box when slidably moved to engage the conductor, and for releasing the conductor by simple sliding movement from the conductor, and a shallow ledge means located adjacent the front of the box for securing the slidable member in the box and against said conductor, said ledge and planar retaining member being accessible from the front of the box when the box does not contain a wiring device so that the planar member can be released from said ledge and the conductor released from said planar member by raising the edge of the member adjacent the front of the box above the ledge.

* * * * *